Feb. 6, 1923.

A. TROSCH.
VERTICAL MULTIPLE SPINDLE MILLING MACHINE.
FILED JULY 21, 1919.

Inventor:
Alfred Trosch
by Clyde L Rogers
his Atty.

Feb. 6, 1923. 1,444,045
A. TROSCH.
VERTICAL MULTIPLE SPINDLE MILLING MACHINE.
FILED JULY 21, 1919. 4 SHEETS-SHEET 4

Inventor:
Alfred Trosch
by Clyde L Rogers
his atty.

Patented Feb. 6, 1923.

1,444,045

UNITED STATES PATENT OFFICE.

ALFRED TROSCH, OF ROCHESTER, NEW YORK, ASSIGNOR TO ARTHUR H. INGLE, OF ROCHESTER, NEW YORK.

VERTICAL MULTIPLE SPINDLE MILLING MACHINE.

Application filed July 21, 1919. Serial No. 312,414.

*To all whom it may concern:*

Be it known that I, ALFRED TROSCH, a citizen of the United States, and resident of Rochester, county of Monroe, State of New York, have invented an Improvement in Vertical Multiple Spindle Milling Machines, of which the following description, in connection with the accompanying drawings, is a specification, like characters on the drawings representing like parts in each of the several views.

This invention relates to metal working machines employing a plurality of rotary spindles and more particularly to a vertical spindle type of machine adapted to operate simultaneously a plurality of rotary tool heads such as milling or facing tools. One principal object is to provide an improved type of vertical multiple spindle milling or like machine equipped with a plurality of cutters adapted to operate on separate work pieces at the same time. A further important object is to provide a machine of the type stated with a rotary work table having driving means equipped with a feed change system adapted for quickly and easily varying the rate of feed movement thereof. A further object is to provide a machine of the type stated wherein the work may be put on and secured to the table or taken off while the table is rotating. A further object is to provide a machine of the type stated with a work table having both horizontal and vertical work clamping faces so arranged that a work piece clamped to either of said faces at any point may be brought into operative relation to any one of the tools of the machine. A further object is to provide a vertical multiple spindle milling machine wherein the milling cutters may be adjusted and set vertically at any required point to take in different dimensions of work. A further object is to provide a machine of the kind stated having an exceptionally simple and direct transmission of power with a central vertical distributing shaft connected to drive the spindles from an upper portion thereof and having its lower end engaged with the feed change system of the work table. Still further objects are to provide a machine of the type stated requiring exceptionally small floor space and wherein all the operating mechanism is enclosed and protected and presents no exposed parts. The foregoing and other objects and advantages of the invention will more fully appear from the following detailed description, and the distinctive features of novelty will be pointed out in the appended claims.

Referring to the drawings.

Figure 1:
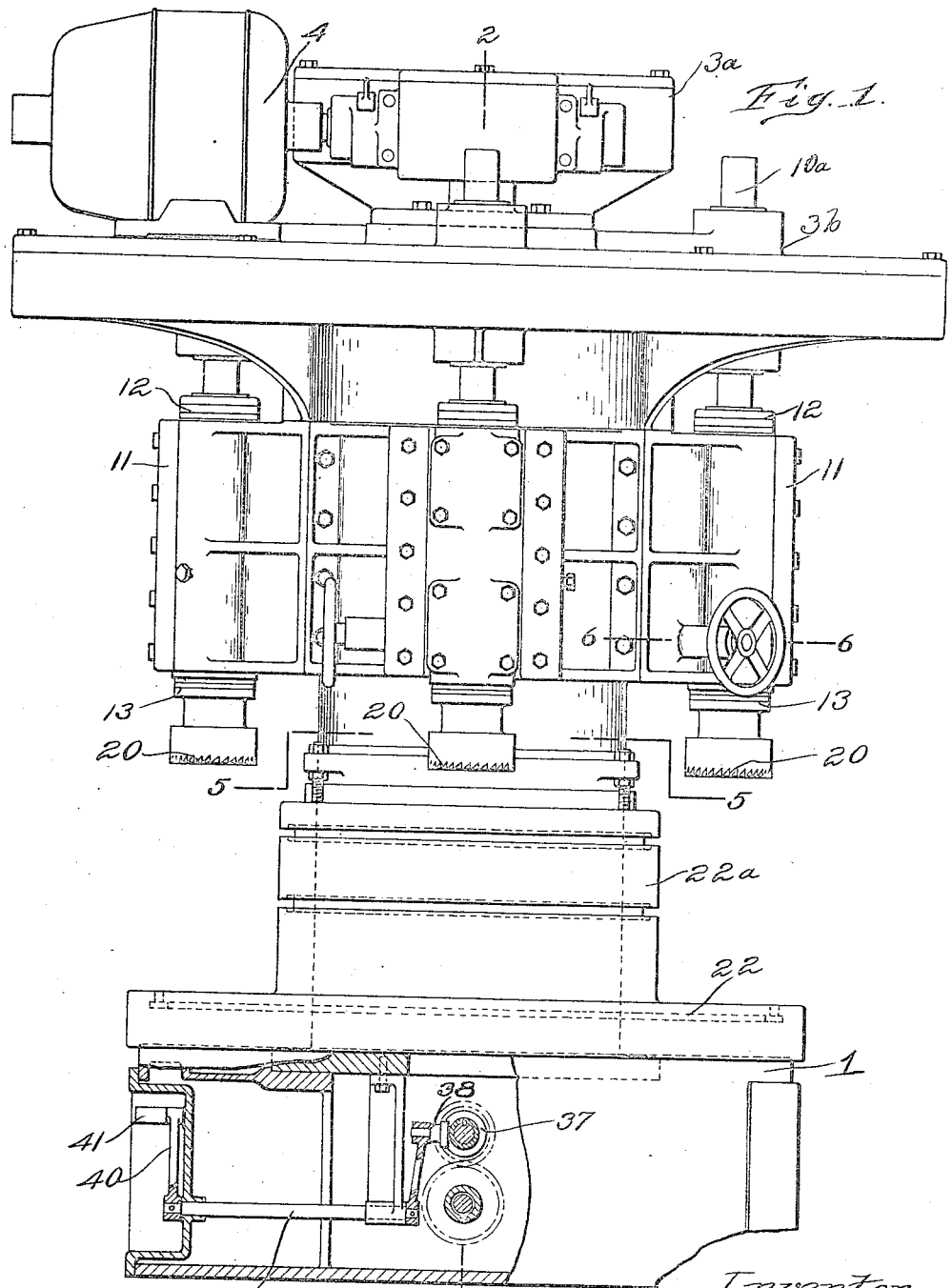
Fig. 1 is a front elevation with a portion broken away in section of a machine embodying the invention.

A base housing 1 is provided equipped with bearings as hereinafter described for the feed change system. This housing has bolted or otherwise secured thereto an upright column 2, both said housing and column being preferably circular in cross section to provide a mounting and bearings for the rotary table as presently described. At the upper end of the column 2 a top housing 3 is secured which is equipped with driving connections to the spindles. This top housing serves as a mounting for the driving element which may be, as shown, a variable speed electric motor 4 for varying the speed of the spindles, having in axial alinement with the shaft thereof and driven thereby a worm 5 meshing with a worm wheel 6 which is fixed at the upper end of a vertical shaft 7 which is journaled to extend centrally upward through the column 2. The worm 5 and worm wheel 6 are shown as both enclosed in a superposed housing 3ª fixed above the top housing 3, this housing 3ª being also equipped with bearings for the worm 5. The shaft 7 has fixed thereon within the housing 3 a spur gear 8 which is in driving relation with a series of gears 9 engaged therewith at spaced apart points, the number of these gears corresponding to the number of spindles in the machine, these being preferably and as shown three in number. The gears 9 are equipped with elongated hubs 9ª extending at each side thereof which are journaled in bosses $3^b$ of the housing 3. Slidably keyed in the hubs $9^a$ are the upper shaft extensions $10^a$ of the tool spindles 10. Since all of these spindles are, or may be, similar in construction and similarly mounted the description of one thereof will suffice for all. Each spindle 10 is journaled in a sleeve 11 and held to move endwise therewith by a lock nut 12 which is threaded on an upper portion thereof while the lower end of said sleeve is engaged with the tool head enlargement of the spindle as indicated at 13. Each sleeve 11 is fitted to slide vertically in a web frame or bracket 14 extending outward from the column 2, said bracket having detachable retaining strips $14^a$ engaging lateral extensions $11^a$ of the sleeve and a lock shoe $14^b$ being provided at one side as shown. The sleeve 11 has an inwardly extending lug $11^b$ thereof equipped with a stationary nut which is engaged by the upper threaded end of a shaft 15. The shaft 15 is journaled to turn and held from endwise movement in a bearing lug $14^c$ formed on the bracket 14 and the lower end of said shaft has fixed thereon a bevel pinion 16 with which meshes a pinion 17 fixed on a horizontal shaft 18 journaled in the bracket 14 and having a hand wheel 19 fixed on a projecting outer end thereof,—these hand wheels thus providing means whereby the several tool spindles may be quickly and easily adjusted individually to any vertical height as required for different dimensions of work. The tool spindles 10 are shown as equipped with usual milling heads 20, these typifying any suitable milling or like rotary tool that the machine is adapted to employ.

Figure 2:
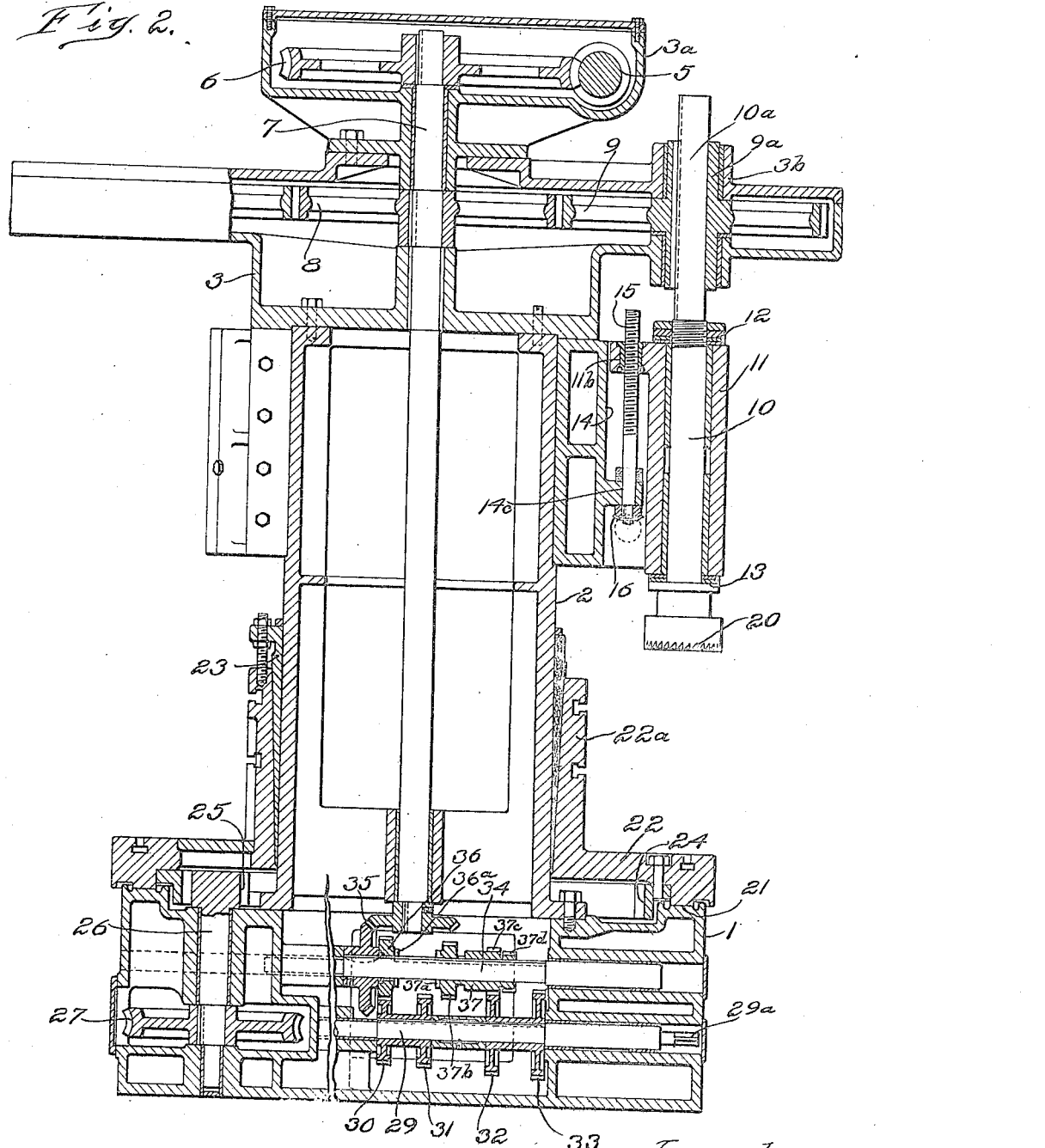
Fig. 2 is a central vertical section on line 2—2 of Fig. 1.
Figure 3:
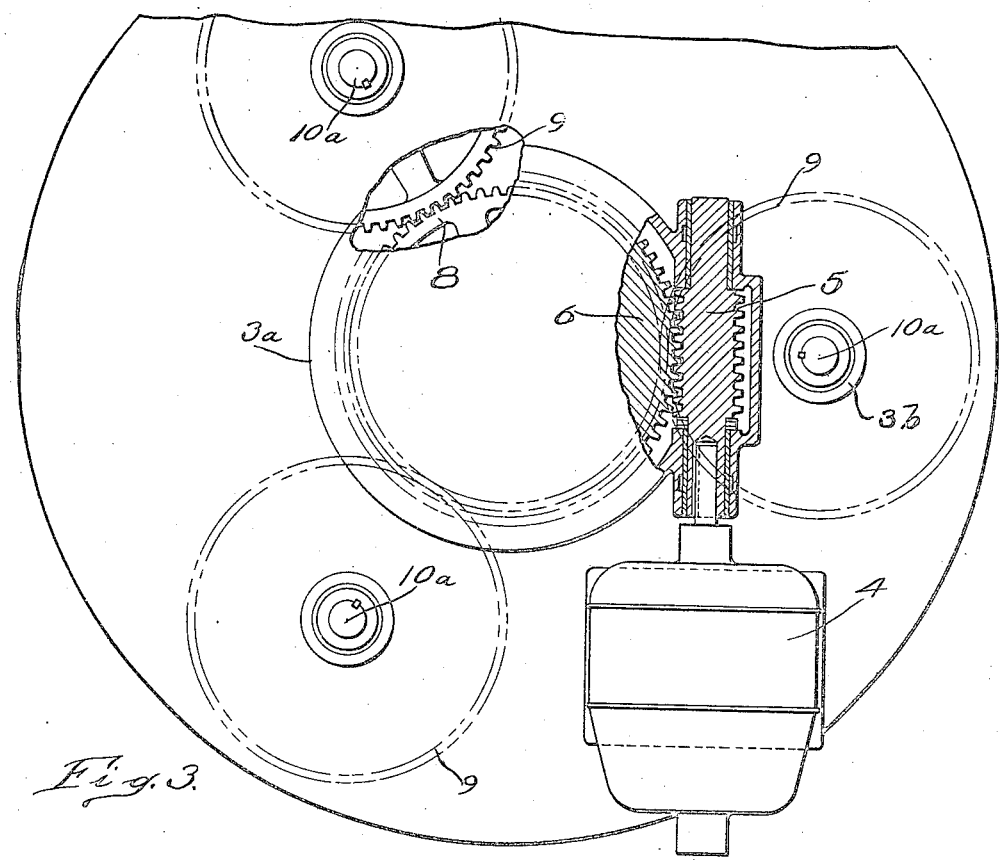
Fig. 3 is a partial plan view with a portion broken away in section.
Figure 4:
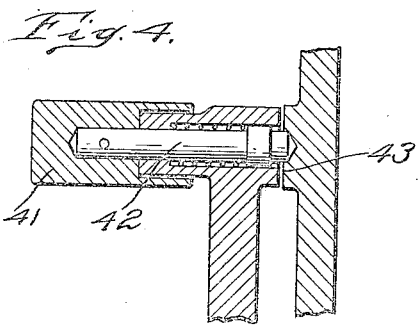
Fig. 4 is an enlarged sectional detail showing the handle lock of the change speed lever.
Figure 5:
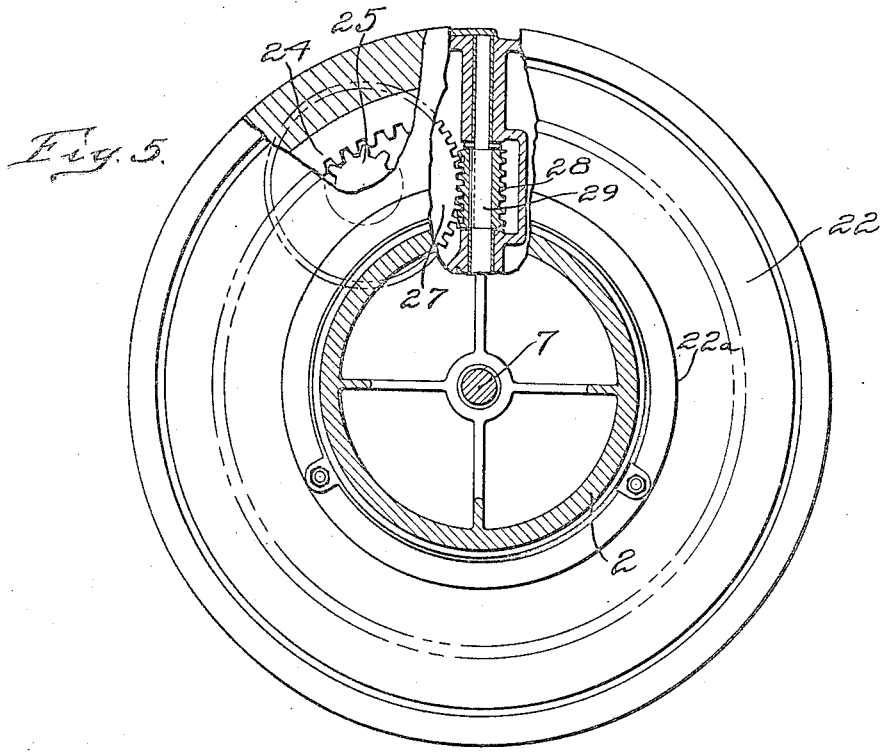
Fig. 5 is a horizontal section on line 5—5 of Fig. 1 with portions broken away to show still lower working parts.
Figure 6:
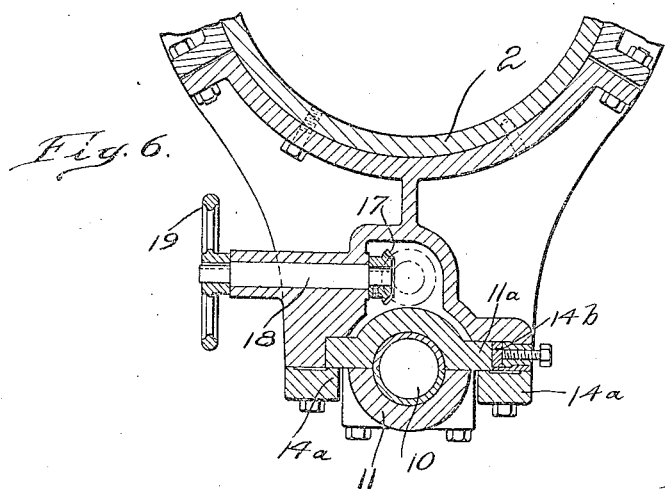
Fig. 6 is a partial horizontal section on line 6—6 of Fig. 1.

Rotatably fitted on a finished annular bearing surface 21 of the base housing 1 is a circular work table 22 which is provided at its inner edge with an upwardly extending sleeve portion $22^a$ which is mounted on and fitted to the column 2, being preferably and as shown, equipped with arcuate wear gibs 23 which are tapered as usual and may be adjusted to maintain a close working fit. The table 22 has fixed to the under surface thereof an internal gear ring 24 which is engaged by a spur pinion 25 carried at the upper end of a short shaft 26 vertically journaled in the housing 1. The shaft 26 has fixed to a lower portion thereof a worm wheel 27 with which meshes a worm 28 fixed on a shaft 29 horizontally journaled in the housing 1. The shaft 29 has fixed thereon in spaced apart relation a series of spur gears 30, 31, 32, 33 of diverse sizes and of progressively increasing size toward the right as seen in Fig. 2. A countershaft 34 is horizontally journaled in the base housing 1 adjacent to and parallel with the shaft 29. The shaft 34 is driven constantly by a bevel gear connection 35 from the lower end of the vertical shaft 7. The shaft 34 has loosely mounted thereon a spur gear 36 meshing with the gear 30 which is the smallest of the gear set 30—33. The gear 36 has a clutch face $36^a$ formed on a side thereof which is adapted to be engaged by a co-operative clutch face $37^a$ formed at the end of a pinion block 37 which is slidably keyed on the shaft 34. Thus when the pinion block 37 is slidably adjusted to an extreme left position as seen in Fig. 2, the gear 36 will be clutched with said pinion block and hence driven by the shaft 34 to transmit driving impulse to the gear 30 and thence through the shaft 29 and worm wheel 27 to rotate the table for feed movement. The pinion block 37 is equipped with a series of spaced apart pinion faces $37^b$, $37^c$, $37^d$ of diverse sizes and adapted to be selectively engaged with the gears 31, 32, 33 according to the position of sliding adjustment of the pinion block 37, it being noted that when said pinion block is at its extreme left hand position, i. e., clutched with the gear 36, all of the pinion faces $37^b$ $37^c$, $37^d$ are disengaged. By thus shifting the pinion block 37 endwise on the shaft 34 any one of four feed changes is obtainable in the drive from the shaft 7 to the work table according to whether the drive from the shaft 34 to the shaft 29 is through the gear 36 or through the different ones of the pinion faces $37^b$, $37^c$, $37^d$. It is to be noted that with the described arrangement of the change feed system it may be compactly fitted within the base housing underneath the upright column 2 and that the entire structure is thus made compact and with relatively small requirements as to floor space, and further that all the operating gearing is completely encased and protected from injury. The outer end of the shaft 29 preferably has a squared extremity $29^a$ permitting it to be engaged by a hand operating wrench or crank to turn the table manually if desired in which case of course all the feed gears will be disengaged. For controlling the endwise shifting of the pinion block 37 it is engaged by a shipper arm 38 fixed at the inner end of a rock shaft 39 journaled in the base housing and having on its outer projecting end an operating arm 40 bearing a handle 41 carried on a spring-pressed locking pin 42 which is adapted to engage selective ones of a series of holes in a segment face 43 on the base housing to thus hold the same locked in a given position of adjustment. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. A machine of the kind described, comprising a base housing having an upright column extending therefrom, a plurality of vertical tool spindles mounted in spaced apart relation on said column, a rotatable work table mounted on said base encircling said column, and operating means for rotating said spindles connected for rotating said table positively and continuously at a definite rate with respect to the rate of spindle rotation.

2. A machine of the kind described, comprising a base having an upright column extending therefrom, a plurality of vertical tool spindles carried by said column in spaced apart relation, a work table mounted for rotation on said base encircling said column, and means for rotating said spindles and for rotating said table positively and continuously including change speed devices housed in said base for varying the rotary movement of the table at will.

3. A machine of the kind described, comprising a base housing having an upright column extending therefrom, a plurality of vertical tool spindles carried by said column, an annular work table mounted to encircle said column, and driving means for rotating said table positively and continuously including change speed devices located in said base housing.

4. A machine of the kind described, comprising a base housing having an upright column extending therefrom, a plurality of vertical tool spindles carried by said column, an annular work table mounted to encircle said column, driving means for rotarily feeding said table including change speed devices located in said base housing with a driving shaft engaged therewith extending upward centrally of said column, connections from said shaft to drive said spindles, and prime driving means for said shaft mounted at the top of said column.

5. A machine of the kind described, comprising a base housing having an upright column extending therefrom, an annular work table equipped to have work pieces secured fixedly thereto mounted on said base with driving connections housed wholly within said base and including devices for imparting variable and selective speeds to the table, and a vertical shaft mounted centrally of said column connected to transmit rotary feed movement to said table through said change speed devices.

6. A machine of the kind described, comprising a base housing having an upright column extending therefrom, an annular work table rotarily mounted on said housing encircling said column, said table equipped with an internal gear, an upright shaft equipped with a pinion engaging said gear, a horizontal shaft in said housing having a worm gear drive to said upright shaft, and a countershaft equipped with change speed elements for driving said horizontal shaft to feed the table at varying selective rates.

7. A machine of the kind described, comprising a base having an upright column extending therefrom, an annular work table mounted on said base encircling said column, with a sleeve extending upwardly therefrom and having bearing on the column, and a plurality of vertical tool spindles borne by the column equipped with means for rotating the same.

8. A machine of the kind described, comprising a base having an upright column extending therefrom, an annular work table mounted to rotate on said base and having an upright sleeve extension encircling said column and adapted to have work clamped thereto, and tool mechanism carried by said column.

9. A machine of the kind described, comprising a base having an upright cylindrical column extending therefrom, a work table rotarily mounted on said base comprising an annular horizontal portion and an upright sleeve portion encircling and fitting said column, both said portions adapted to have work clamped thereto, and tool mechanism carried by said column.

10. A machine of the kind described, comprising a base having an upright column extending therefrom, a work table fitted to said base equipped with means to feed the same rotarily, and a plurality of vertical milling tool spindles mounted on said column having means to drive the same simultaneously and each having provision for independent vertical adjustment.

11. A machine of the kind described, comprising a base equipped with a vertical column, a work table rotarily mounted on said base, a plurality of vertical milling tool spindles mounted on said column, each equipped with provision for individual vertical adjustment, a vertical shaft extending centrally of said column equipped with connections at its lower end to feed said table rotarily, said shaft having also gear connections to drive all said spindles simultaneously, and a prime motor mounted at the top of said column with a worm gear drive to said shaft.

In testimony whereof, I have signed my name to this specification.

ALFRED TROSCH.